United States Patent
Meiri

(10) Patent No.: US 9,749,385 B2
(45) Date of Patent: Aug. 29, 2017

(54) HIERARCHAL MAXIMUM INFORMATION RATE ENFORCEMENT

(71) Applicant: Gilat Satellite Networks Ltd., Petah Tikva (IL)

(72) Inventor: Tzvika Meiri, Modi'in (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 933 days.

(21) Appl. No.: 13/900,630

(22) Filed: May 23, 2013

(65) Prior Publication Data

US 2013/0318201 A1    Nov. 28, 2013

Related U.S. Application Data

(60) Provisional application No. 61/651,402, filed on May 24, 2012.

(51) Int. Cl.

| | |
|---|---|
| *G06F 15/16* | (2006.01) |
| *H04L 29/06* | (2006.01) |
| *H04L 12/851* | (2013.01) |
| *H04L 12/869* | (2013.01) |

(52) U.S. Cl.
CPC ......... *H04L 65/80* (2013.01); *H04L 47/2433* (2013.01); *H04L 47/60* (2013.01)

(58) Field of Classification Search
USPC ....................................................... 709/217
See application file for complete search history.

(56) References Cited

U.S. PATENT DOCUMENTS

| | | | | |
|---|---|---|---|---|
| 5,936,956 A | * | 8/1999 | Naven ................... | G06F 13/387 370/395.7 |
| 2005/0262266 A1 | * | 11/2005 | Wiberg .................. | H04L 47/10 709/238 |
| 2008/0049773 A1 | * | 2/2008 | Utsunomiya ........... | H04L 12/66 370/412 |
| 2008/0159135 A1 | * | 7/2008 | Caram ................... | H04L 47/10 370/230 |
| 2008/0247402 A1 | * | 10/2008 | Sasaki .................... | H04L 47/10 370/401 |
| 2011/0083175 A1 | | 4/2011 | Bharrat et al. | |
| 2011/0153969 A1 | * | 6/2011 | Petrick .................. | G06F 21/606 711/163 |
| 2011/0292792 A1 | * | 12/2011 | Zuo ........................ | H04L 47/20 370/230 |

(Continued)

OTHER PUBLICATIONS

The extended European search report dated Feb. 10, 2013.
European Office Action—EP. Appl. 13168869.9—dated Mar. 24, 2017.

*Primary Examiner* — Arvin Eskandarnia
(74) *Attorney, Agent, or Firm* — Banner & Witcoff, Ltd.

(57) ABSTRACT

A communication system may be configured to transmit information from one or more information sources to a plurality of users over limited capacity media while enforcing one or more Quality of Service policies, such as maximum information rate (MIR) policies. Methods are presented herein for enforcing maximum information rate on two or more levels in a hierarchal and extendable manner, for at least the purposes of maximizing utilization of available capacity over said media and of fair distributing said capacity between all users. Also presented herein is a method for estimating load over said media.

19 Claims, 3 Drawing Sheets

(56) References Cited

U.S. PATENT DOCUMENTS

2013/0036175 A1* 2/2013 Lau .................. G08B 27/001
  709/206
2013/0044755 A1* 2/2013 Liu .................. H04L 47/568
  370/394

* cited by examiner

HIERARCHAL MAXIMUM INFORMATION RATE ENFORCEMENT

CROSS-REFERENCE TO RELATED APPLICATIONS

This application claims priority to U.S. Provisional Application Ser. No. 61/651,402, filed May 24, 2012, and entitled "Hierarchal Maximum Information Rate Enforcement," which is hereby incorporated by reference in its entirety.

FIELD OF THE INVENTION

Aspects of the disclosure pertain to the field of data communication systems and to enforcement of Quality of Service in such systems.

BACKGROUND

A communication system includes a media of limited capacity connecting a source of information (data) to a plurality of users. The media could be either a wired media or a wireless media. In order to enable all users to share the limited capacity media, the communication system often enforces one or more Quality of Service (QoS) policies. One QoS policy, which is commonly used in communication systems, is maximum information rate (MIR).

A communication system serving a plurality of users often enforces MIR on more than one level. In such system, MIR has to be enforced both on a per user basis, but also the total information rate must be enforced, often in accordance with the limited capacity of the media. However, when MIR is enforced on more than one level, independently limiting the transmission information rate at each level often results in undesired outcomes.

Enforcing MIR of the media without considering how the limited capacity is being distributed between the multiple users often results in lack of fairness between the users. For example, if the MIR value associated with one user is twice the MIR value associated with a second user, independent enforcement of the media MIR often results in reducing the information rate for both users but without the capacity allocated to the first user being twice as high as the capacity allocated to the second user.

On the other hand, since the media is there, it is desirable to utilize as much of its available capacity as possible as per the existing demand from all users. If the media capacity is distributed between the users only in accordance with MIR values associated with the users, when demand of some users is less than their associated MIR values while demand of other users exceeds their associated MIR, the media might be underutilized while information that could be transmitted over the media is not transmitted. Instead, it would be desirable to allocate each user more than its MIR and to maximize the utilization of the available capacity. Yet, the available capacity has to be distributed between the users on a fair basis, e.g. a user which has higher MIR has to get higher capacity.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a method in a communication system comprising a limited capacity media for enforcing maximum information rate (MIR) on two or more levels in a hierarchal and extendable manner. A queuing mechanism and an algorithm for at least the purpose of operating said queuing mechanism are presented herein. The disclosed method may help ensure maximum utilization of the available capacity over said media as well as fair distribution of said capacity between all users regardless of the load (e.g. demand to transmit information) over said media. In some embodiments, said queuing mechanism and algorithm may be extended to support enforcement of committed information rate (CIR) as well as maximum information rate (MIR).

Aspects of the disclosure are directed to enforcing maximum information rate on two or more levels in a hierarchal and extendable manner at two or more enforcers, wherein the two or more enforcers share a common media.

Aspects of the disclosure are directed to a method in a communication system comprising a limited capacity media for enforcing maximum information rate on two or more levels in a hierarchal and extendable manner, wherein the enforcement is in accordance with information rate either at the input to the communication system or over said media. As the communication system may be configured to process information going through it prior to transmitting it over said media using one or more algorithms that may alter the information rate (for example compression algorithms, encryption algorithms, acceleration algorithms, etc.), selecting the information rate point of reference for at least the purpose of enforcing a maximum information rate may affect the enforcement results.

Aspects of the disclosure are directed to a method in a communication system comprising a limited capacity media for estimating a load over said media. In some embodiments, load may be defined as a ratio between an amount of information that may be pending to be transmitted and an amount of information that may be actually transmitted. In some embodiments, once load estimation may be obtained, it may be used for adjusting maximum information rate (MIR) settings within an MIR enforcement mechanism.

BRIEF DESCRIPTION OF THE DRAWINGS

Figure 1:
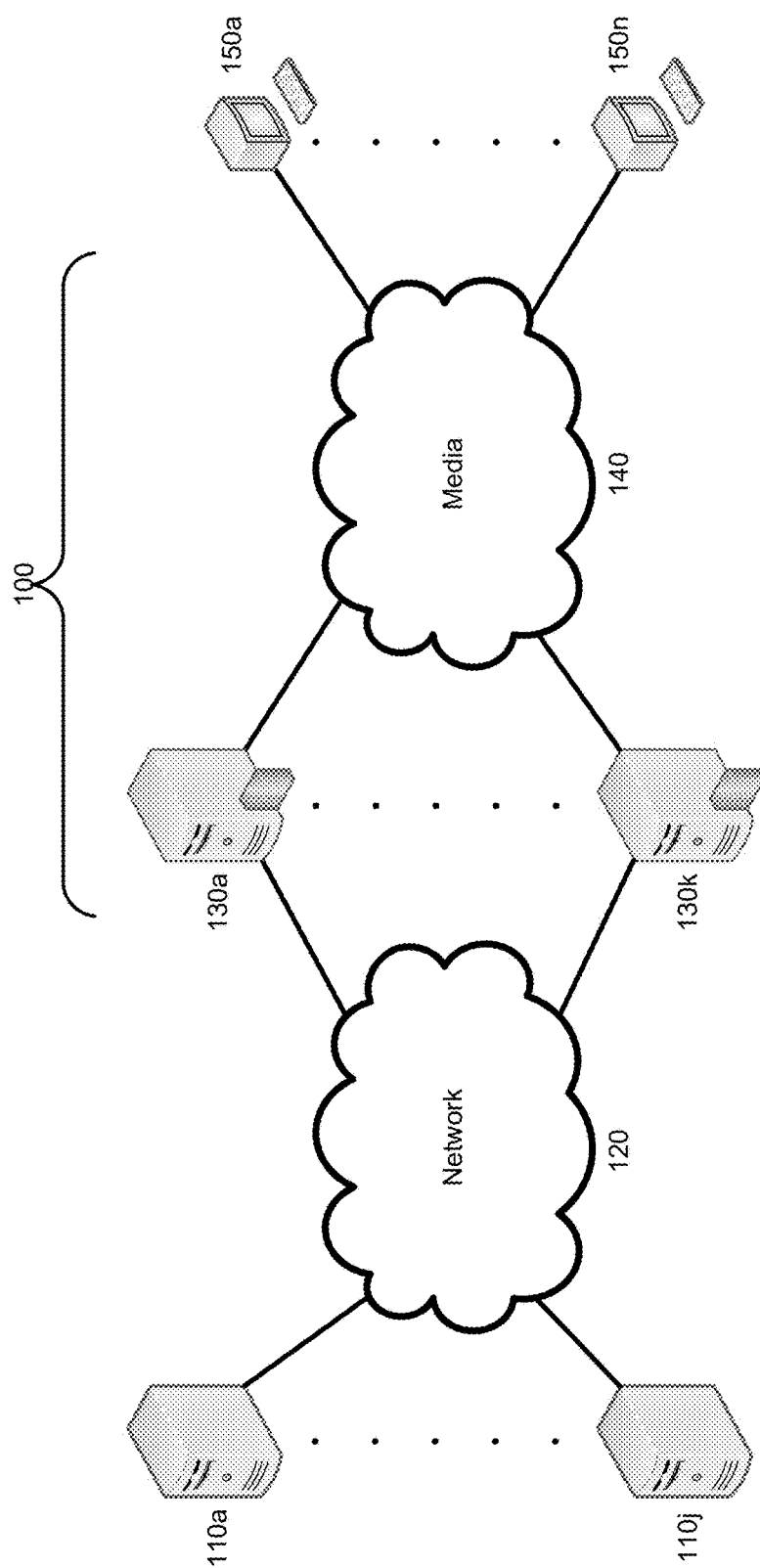

Having thus described the disclosure in general terms, reference will now be made to the accompanying drawings, which are not necessarily drawn to scale, and wherein:

FIG. 1 shows an example of a communication system in accordance with aspects of the disclosure.

Figure 2:
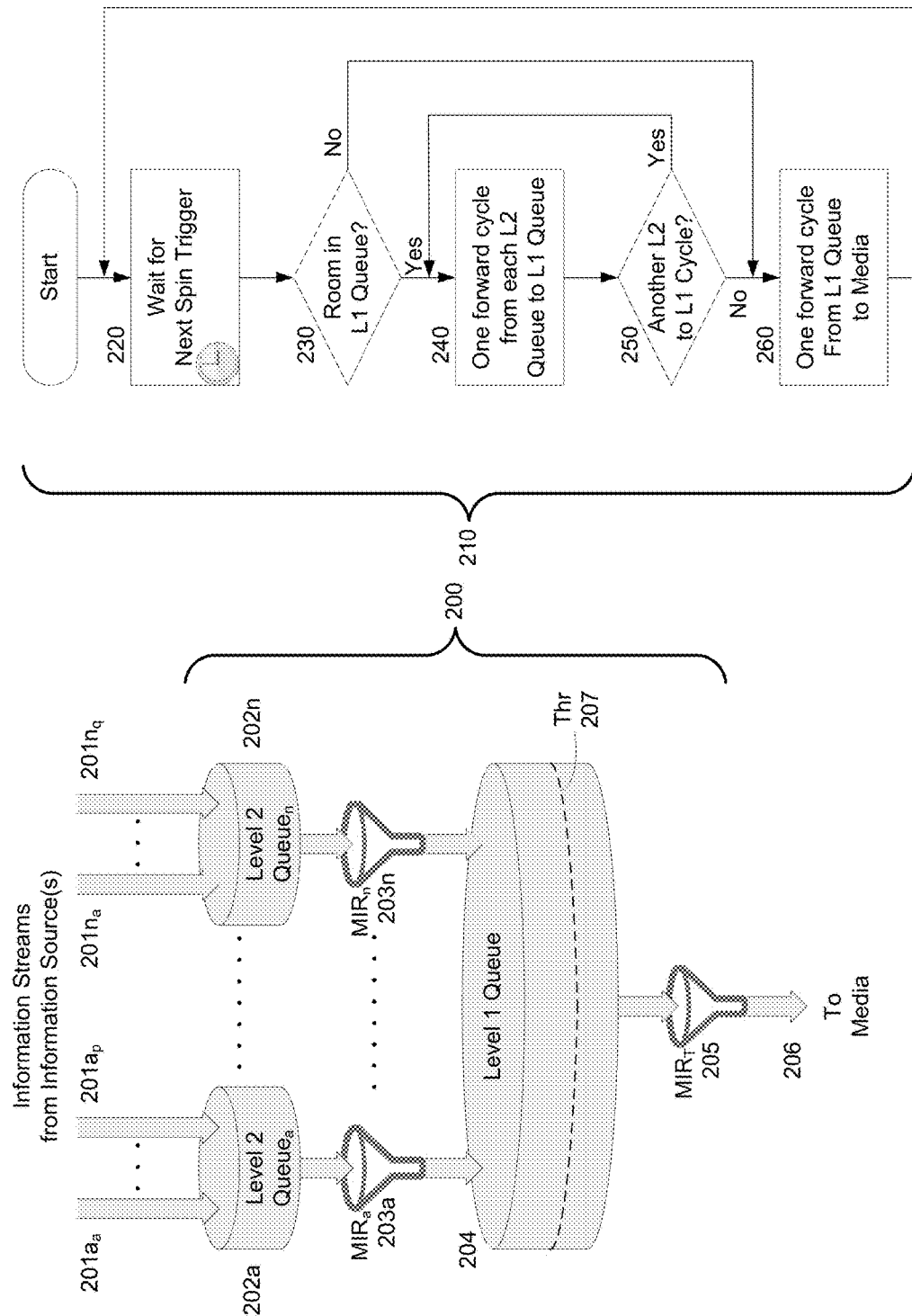

FIG. 2 shows a first example of a queuing mechanism in accordance with aspects of the disclosure.

Figure 3:
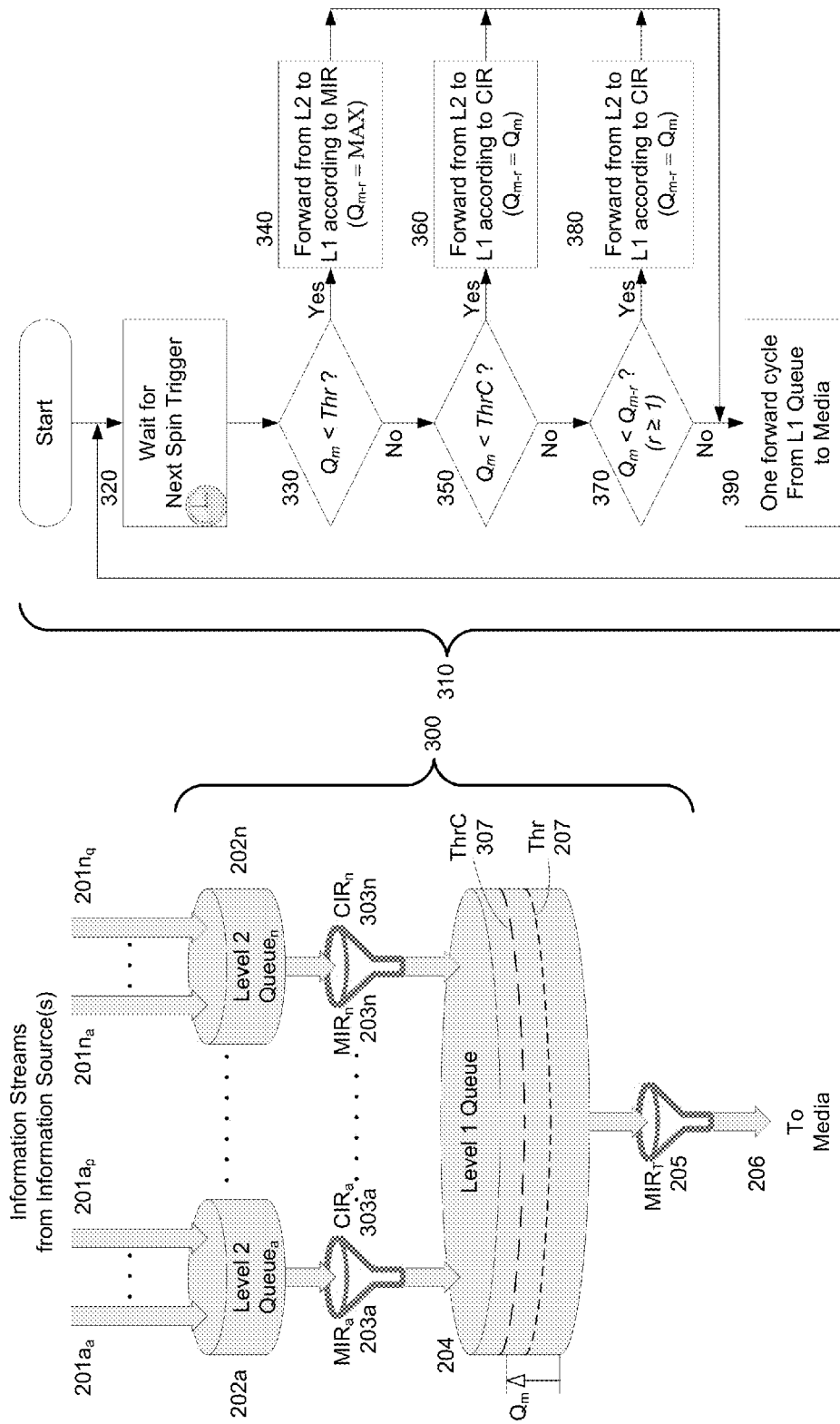

FIG. 3 shows a second example of a queuing mechanism in accordance with aspects of the disclosure.

DETAILED DESCRIPTION

FIG. 1 shows an example communication system 100, which may be configured to allow transmission of (data) information from one or more information sources 110*a-j*, which may be connected to communication system 100 directly and/or via network 120, to one or more users (typically a plurality of users 150*a-n*) over limited capacity media 140. Media 140 may be either a wired media (e.g. a cable carrying electric signals and/or an optical fiber carrying optical signals) or a wireless media (e.g. a radio link, carrying electromagnetic signals, either directly or via one or more relay stations, for example repeaters or satellites). In addition, communication system 100 may include one or more information data processors 130a-k, which may be variously configured such as to at least enforce one or more Quality of Service (QoS) policies. In some embodiments, one or more of the data processor(s) 130a-k may be configured to enforce one or more maximum information rate (MIR) policies.

In one aspect of the disclosure, one or more data processor(s) 130a-k may be configured to enforce maximum information rate (MIR) policies on two or more levels in a hierarchal and extendable manner.

Referring to FIG. 2, one or more of the data processor(s) 130a-k may be configured to include and/or use a queuing mechanism such as queuing mechanism 200. FIG. 2 also shows flowchart 210 that may describe an algorithm, which one or more data processor(s) 130a-k may be configured to use at least for the purpose of operating queuing mechanism 200. It is noted that FIG. 2 shows a queuing mechanism with 2 levels of queuing. Similar queuing mechanisms with 3 or more levels may be constructed and similar algorithms for operating such similar queuing mechanisms may be used while maintaining the same principles of operation as described herein and without departing from the scope of the disclosure.

For the sake of simplicity, the description herein may refer to a data processor 130 and to a user 150, wherein data processor 130 may be any one of the one or more data processor(s) 130a-k and user 150 may be any one of the one or more user(s) 150a-n. This type of simplification may also extend to other described elements, where applicable.

Information (e.g. data) from one or more information sources 110a-j may be received at data processor 130 as a multiplicity of streams $201a_a$ to $201n_q$ using one or more protocols (for example, TCP, UDP, etc.). Furthermore, information destined for any one user 150 may also be received as multiple streams using one or more protocols (for example streams $201a_a$ to $201a_p$ for user 150a, streams $201n_a$ to $201n_q$ for user 150n). In some embodiments, for each of the user(s) 150a-n, one of the data processor 130a-k may queue information destined to that user in a level 2 queue, such as queues 202a-n corresponding to user(s) 150a-n. For example, data processor 130a may queue all information destined to user 150e in a level 2 queue 202e corresponding to user 150e. In addition, information queued for transmission over media 140 may be queued in level 1 queue 204 (e.g., the transmission queue).

Referring to the flow chart in FIG. 2, data processor 130 may employ a periodic timer or a system tick generator for at least the purpose of generating periodic events at constant intervals (e.g. t), wherein each event may trigger another spin of the algorithm. Data processor 130 may be configured, upon receiving a trigger to start a new spin (220), to determine whether level 1 queue 204 has room for additional information (230). In some embodiments, the step of determining may be performed for example by comparing the amount of information queued in level 1 queue 204 with threshold level 207 (Thr). In some embodiments, threshold level 207 (Thr) may be set so that the amount of information that may be stored in level 1 queue 204 may be sufficient to ensure continuous transmission of information over media 140 (e.g., avoiding media starvation) and the latency that may result from queuing information in level 1 queue 204 may be minimized. In some embodiments, threshold level 207 (Thr) may reflect an amount of information that may be transmitted over media 140 during a predefined number of intervals (e.g. each of duration t). In some embodiments, this predefined number of intervals may be set quite low, for example to 2 or 3, for at least the purposes of maintaining latency that may be inflicted by queuing mechanism 200 relatively low. On the other hand, with each spin of the algorithm, level 1 queue 204 may hold an amount of information which may be several times the amount of information that may be transmitted over media 140 during any one spin. In some embodiments, this may help ensure continuous transmission of information (e.g. without starvation) and/or maximum utilization of the capacity over media 140, even in the presence of some variations in transmission capacity over media 140. Such variations may be experienced, for example, in a satellite communication system, wherein media 140 may be an adaptive link having variable throughput.

Data processor 130 may be further configured, upon determining (230) that level 1 queue 204 may have room for additional information (e.g. the amount of information queued may be lower than threshold level 207 (Thr)), to perform one cycle of forwarding information from each level 2 queue 202a-n to level 1 queue 204 (240), wherein the amount of information forwarded from a level 2 queue (e.g. 202a) may be in accordance with an MIR figure (e.g. 203a) associated with a user (e.g. 150a) associated with the first level 2 queue (e.g. 202a), and in accordance with said events interval (t). For example, if MIR, corresponding to a user 150a may be given in, e.g., kilobits per second (Kbps) and said events interval (t) may be given in, e.g., seconds, the maximum amount of information, in e.g., kilobits, that may be forwarded from level 2 queue 202a to level 1 queue 204 in any one forwarding cycle may be calculated as $MIR_a*t$, wherein less or no information may be forwarded if level 2 queue 202a may hold less than the calculated maximum amount of information or no information at all, respectively. Because in each cycle of forwarding information from level 2 queues 202a-n to level 1 queue 204 the amount of information forwarded from each level 2 queue 202 may be in accordance with the MIR value associated with the respective queue, the total capacity of media 140 may be shared by all users 150a-n in a fair manner. For example, for any two users, e.g. $150_a$ and $150_b$, if $MIR_a$ associated with user 150a is, e.g., M times $MIR_b$ associated with user 150b (e.g. $MIR_a=M*MIR_b$), and if the amounts of information forwarded for users 150a and 150b in each forwarding cycle from level 2 queues 202a-n to level 1 queue 204 equal $MIR_a*t$ and $MIR_b*t$ respectively, then user 150a may receive information at a rate M times the rate at which user 150b may receive information, regardless of the load on media 140. For example, if user 150a may receive traffic at a rate which may be half of the MIR associated with user 150a (e.g. $0.5*MIR_a$), then user 150b may receive traffic at a rate which may be half of the MIR associated with user 150b (e.g. $0.5*MIR_b$).

Data processor 130 may be further configured, upon completing an information forwarding cycle 240, to determine whether another cycle of forwarding information from level 2 queues 202a-n to level 1 queue 204 may be performed (250), e.g., during the same spin. Data processor 130 may be configured to perform another information forwarding cycle 240 if level 1 queue 204 may have room for additional information (e.g. if the amount of information queued in level 1 queue 204 may be lower than threshold level 207 (Thr)) and if at least one of the level 2 queues 202a-n may still have queued information. Data processor 130 may be so configured at least for the purpose of utilizing the capacity available over media 140 as much as possible when communication system 100 may be under-utilized. Though this may imply transmitting information towards one or more users 150*a-n* at rates higher than their respectively associated MIR values, still fairness between a plurality of users e.g., 150*a-n* may be maintained as previously described.

Furthermore, data processor 130 may be configured, upon determining that no (additional) information may be forwarded from level 2 queues 202*a-n* to level 1 queue 204, to forward information from level 1 queue 204 towards media 140 (e.g., as in step 260). In some embodiments, the amount of information forwarded from level 1 queue 204 towards media 140 in any one forwarding cycle (e.g., spin) may be in accordance with a value of $MIR_T$ (205), which may be set in accordance with the capacity of media 140, and in accordance with the events interval (t). For example, if $MIR_T$ may be given in, e.g., kilobits per second (Kbps) and the said events interval (t) may be given in, e.g., seconds, the maximum amount of data, in, e.g., kilobits, that may be forwarded from level 1 queue 204 towards media 140 in any one forwarding cycle (e.g., spin) may be calculated as $MIR_T*t$, wherein less information may be forwarded if level 1 queue 204 may hold less than the calculated maximum amount of information. In some embodiments, connectivity between data processor 130 and media 140 may be in accordance with a protocol wherein one or more flow control mechanisms may be used. In such embodiments, it may be up to media 140 to control the forwarding of information form level 1 queue 204. Thus, the amount of information that may be forwarded from level 1 queue 204 towards media 140 in a forwarding cycle (spin) may be lower than said calculated maximum amount of information, at least due to use of, for example, flow control mechanisms by media 140. For example, assuming that a calculated maximum amount of information that may be forwarded from level 1 queue 204 towards media 140 in a forwarding cycle (spin) may be X kilobits, that level 1 queue 204 may hold at least 2X kilobits of information queued, and that at a current information forwarding cycle (e.g., spin) only Y kilobits (Y<X) may be forwarded (e.g. due to flow control by media 140). In that example, at the next information forwarding cycle X kilobits may be forwarded (e.g. if no flow control may be used by media 140), wherein these X kilobits may include the X−Y kilobits left from the previous information forwarding cycle.

It is noted that data processor 130 may determine that no information may be forwarded from level 2 queues 202*a-n* to level 1 queue 204 at the beginning of an algorithm spin, e.g. immediately after occurrence of said periodic event (e.g., at step 230), e.g. due to determining that level 1 queue 204 may have no room for additional information (e.g. the amount of information queued may be higher than or equal to threshold level 207 (Thr)). In that case, no information may be forwarded from level 2 queues 202*a-n* to level 1 queue 204 during that spin of the algorithm and the only action that may be taken during that spin may be the forwarding of information from level 1 queue 204 towards media 140. Thus, as the load on communication system 100 and/or on media 140 becomes higher, the algorithm presented herein may actually utilize less of data processor 130 processing resources.

In addition, spins of the algorithm in which information may be forwarded only from level 1 queue 204 towards media 140 (e.g. without forwarding information from level 2 queues 202*a-n* towards level 1 queue 204) may have the effect of reducing the effective MIRs of all users 150*a-n* while fully utilizing the available capacity over media 140. For example, if no forwarding of information from level 2 queues 202*a-n* to level 1 queue 204 occurs in one of every two spins, the effective MIR for each user may be reduced by 50% while keeping media 140 fully utilized and while distributing the capacity of media 140 between one or more user(s) 150*a-n* in a fair manner and in accordance with the respective MIR values associated with the one or more user(s) 150*a-n*.

In some embodiments of the algorithm previously discussed, a different order of forwarding information may be exercised. For example, the step of forwarding information from level 1 queue 204 towards media 140 (e.g., step 260) may be performed prior to the steps of determining whether level 1 queue 204 may have room for additional information (e.g., step 230) and the other steps following said determining (e.g. steps 240 and 250). However, this variation may have insignificant or no effect on the behavior of the entire mechanism, as previously described.

Furthermore, queuing mechanism 200 and the algorithm described by flowchart 210 may be extended to support more than two enforcement levels without departing from the scope of the disclosure.

In one embodiment, a third level of enforcement may be added to mechanism 200 by adding a layer 3 queue for each TCP connection or stream, wherein each layer 3 queue may be associated with a TCP MIR. It may be noted that such embodiment may be based on using one or more flow control methods for slowing down and/or pausing the flow of TCP traffic when a layer 3 queue is filling up or becoming full and may not hold additional information.

In the above described embodiment, the relationship between layer 3 queues associated with streams of information destined to a user 150 and a layer 2 queue 202 associated with the same user 150 may be similar to the relationship previously described between layer 2 queues 202*a-n* and layer 1 queue 204. Each layer 2 queue 202 may be associated with a threshold (e.g. $Thr2_a$ to $Thr2_n$). For each spin of the algorithm, data processor 130 may first determine for each layer 2 queue 202 whether it may have room for additional information (e.g. by determining whether the amount of information queued may be lower than the respective threshold level (Thr2)). For each layer 2 queue 202 having room for additional information, data processor 130 may perform one or more cycles of forwarding information from the respective layer 3 queues to the layer 2 queue 202 in accordance with the respective TCP MIR values, until the respective threshold level (Thr2) is reached or exceeded. Once all layer 2 queues 202*a-n* are handled and no more information may be forwarded from layer 3 queues to layer 2 queues 202*a-n*, data processor 130 may perform the algorithm in reference to layer 2 queues 202*a-n* and layer 1 queue 204 as previously described.

In another embodiment, a third level of enforcement may be added to mechanism 200 by adding a layer of queues between layer 1 and layer 2. Such embodiment may be used, for example, for enforcing MIR on groups of users. In such embodiment, the user level queues may become the layer 3 queues, the queues associated with groups of users may become layer 2 queues and layer 1 queue 204 may remain as previously described. Thus the workings of this embodiment may be similar to those previously described.

In some embodiments, queuing mechanism 200 and the algorithm described by flowchart 210 may be extended to support enforcement of committed information rate (CIR). A CIR assignment may be used for ensuring a minimal information rate at each level but level 1 (e.g. either for a user 150 or for a group of users in case of a 3-levels enforcement embodiment), as long as the entire capacity over media 140 may not be over committed to CIR assignments.

Referring to FIG. 3, one or more of data processor(s) 130*a-k* may be configured to include and/or use queuing mechanism 300, which may be similar to queuing mechanism 200 with perhaps the addition of applicable CIR assignments (303) and with an additional CIR threshold level 307 (ThrC) in reference to level 1 queue 204. Furthermore, FIG. 3 shows flowchart 310 that may describe an algorithm, which one or more of data processor(s) 130*a-k* may be configured to use at least for the purpose of operating queuing mechanism 300.

At least for the purpose of enforcing CIR, CIR threshold level 307 (ThrC) may be used in reference to level 1 queue 204, wherein CIR threshold level 307 may be set higher than MIR threshold level 207 (e.g. ThrC>Thr). In some embodiment, CIR threshold level 307 (ThrC) may reflect an amount of information that may be transmitted over media 140 during a second predefined number of triggering intervals (e.g. each of duration t), wherein the second predefined number of intervals is greater than the predefined number of intervals that may be used for determining MIR threshold level 207 (Thr). In some embodiments, wherein the number of said intervals for determining MIR threshold level 207 (Thr) may be set to 2 or 3, said second predefined number of intervals for determining CIR threshold level 307 (ThrC) may be set to 5.

Furthermore, data processor 130 may be configured for each spin of the algorithm (320) to determine whether the amount of information queued in layer 1 queue 204 (e.g. $Q_m$) may be either lower than MIR threshold level 207 (e.g. $Q_m$<Thr<ThrC) (330), higher than or equal to MIR threshold level 207 but lower than CIR threshold level 307 (e.g. Thr≤$Q_m$<ThrC) (step 350), or higher than or equal to CIR threshold level 307 (e.g. Thr<ThrC≤$Q_m$) (step 370). If the amount of information queued in layer 1 queue 204 (e.g. $Q_m$) may be lower than MIR threshold level 207 (e.g. $Q_m$<Thr<ThrC) (step 330), data processor 130 may be configured to forward information from layer 2 queues 202*a-n* to layer 1 queue 204 in accordance with MIR values 203*a-n* associated with layer 2 queues 202*a-n* (step 340). If the amount of information queued in layer 1 queue 204 may be higher than or equal to MIR threshold level 207 but lower than CIR threshold level 307 (e.g. Thr≤$Q_m$<ThrC) (step 350), data processor 130 may be configured to forward information from layer 2 queues 202*a-n* to layer 1 queue 204 in accordance with CIR values 303*a-n* associated with layer 2 queues 202*a-n* (step 360). However, if the amount of information queued in layer 1 queue 204 (e.g. $Q_m$) may be higher than or equal to CIR threshold level 307 (e.g. Thr<ThrC≤$Q_m$), data processor 130 may be configured to forward information from layer 2 queues 202*a-n* to layer 1 queue 204 in accordance with CIR values 303*a-n* associated with layer 2 queues 202*a-n* (step 380) only if the amount of information that may be queued in layer 1 queue 204 at the beginning of the current spin (e.g. $Q_m$) may be lower than the amount of information that may have been queued in layer 1 queue 204 at the beginning of a last spin in which information may have been forwarded from layer 2 queues 202*a-n* to layer 1 queue 204 based on CIR values 303*a-n* (e.g. $Q_{m-r}$, wherein r≥1 and wherein Thr<ThrC≤$Q_m$<$Q_{m-r}$) (step 370). In addition, once forwarding of information from level 2 queues 202*a-n* to level 1 queue 204 is complete, data processor 130 may be configured to forward information from level 1 queue 204 towards media 140 (step 390), as previously described in reference to step 260 of flowchart 210. Thus, when the demand for transmitting information over media 140 may exceed the available capacity (e.g. media 140 may be overloaded) and the effective MIRs of users 150*a-n* may be reduced (as previously described), the above described mechanism may ensure that each user 150 may receive information at a rate not lower than its associated CIR value, at least as long as the entire capacity over media 140 may not be over committed to CIR assignments. On the other hand, when the entire capacity of media 140 may be over committed to CIR assignments, media 140 may be fully utilized and its capacity may be distributed between one or more users 150*a-n* in a fair manner and in accordance with the respective CIR values associated with one or more users 150*a-n*.

Regarding the above, two points may be noted. First, regarding the forwarding of information from layer 2 queues 202*a-n* to layer 1 queue 204, in each spin either information may be forwarded in accordance only with MIR values 203*a-n*, or information may be forwarded in accordance only with CIR values 202*a-n*, or no information may be forwarded at all. Second, the recording of the amount of information that may have been queued in layer 1 queue 204 at the beginning of a last spin (e.g. $Q_{m-r}$) may be updated in each spin at which information may be forwarded from layer 2 queues 202*a-n* to layer 1 queue 204 (e.g., steps 340, 360, and/or 380). In a spin where information may be forwarded from layer 2 queues 202*a-n* to layer 1 queue 204 based on CIR values 303*a-n* (e.g., steps 360, 380), said recorded amount of information corresponding to a last spin may be set to the amount of information that may have been queued in layer 1 queue 204 at the beginning of the current spin (e.g. $Q_{m-r}=Q_m$). In a spin where information may be forwarded from layer 2 queues 202*a-n* to layer 1 queue 204 based on MIR values 203*a-n* (step 340), said recorded amount of information corresponding to a last spin may be set to a sufficiently high value (e.g. $Q_{m-r}$=MAX), for example a value greater than the maximum size of level 1 queue 204. Thus, if between a current spin and a said last spin there may have been one or more spins in which information may have been forwarded from layer 2 queues 202*a-n* to layer 1 queue 204 based on MIR values 203*a-n*, condition 370 (e.g. $Q_m$<$Q_{m-r}$) may be true and a forwarding information cycle from layer 2 queues 202*a-n* to layer 1 queue 204 based on CIR values 303*a-n* (step 380) may be performed. Thus, forwarding of information from layer 2 queues 202*a-n* to layer 1 queue 204 in accordance with CIR values 303*a-n* may be allowed as long as there may be no CIR overbooking, e.g. as long as the amount of information forwarded from level 2 queues 202*a-n* to level 1 queue 204 in accordance with CIR values 303*a-n* may be lower than the amount of traffic that may be forwarded from level 1 queue 204 towards media 140.

In another aspect of the disclosure, communication system 100 may be configured to enforce maximum information rate on two or more levels using two or more data processors 130*a* to 130*k*, wherein the two or more data processors 130*a* to 130*k* share common media 140. In some embodiments, system 100 may be further configured to divide the plurality of users 150*a-n* between said data processors 130*a* to 130*k* so that each user 150 may be serviced by a single one of the one or more of data processor(s) 130*a-k*.

Each of data processors 130*a-k* may be configured to include and/or use a queuing mechanism as shown in FIG. 2 (200) or as shown in FIG. 3 (300) and to use an algorithm as described in flowchart 210 or in flowchart 310 for at least the purpose of operating said queuing mechanism. In addition, connectivity between the data processors 130*a-k* and media 140 may be in accordance with a protocol wherein one or more flow control mechanisms may be used. Thus the amount of information that may be forwarded by a data processor 130 towards media 140 in a forwarding cycle may be lower than the amount of information that data processor 130 may attempt to forward at that cycle, at least due to use of said flow control mechanisms by media 140.

Furthermore, for each of the data processor 130*a-k*, MIR value 205 (e.g. $MIR_T$) which may be associated with its level 1 queue 204 may be set in accordance with the full capacity of media 140. Thus, each one of data processors 130*a-k* (e.g. 130*a*) may utilize the entire capacity of media 140 in case the one or more other data processors (e.g. 130*b* to 130*k*) may be idling and/or forwarding no information towards media 140. Consequently, for each spin, each of the data processors 130*a-k* may attempt to forward information from its level 1 queue 204 towards media 140 in accordance with the full capacity of media 140, though that entire capacity may not be fully available to each of the data processors 130*a-k*.

However, whenever two or more data processors 130*a* to 130*k* may attempt to forward a total amount of information which exceeds the amount of information that may be transmitted over media 140, the flow control mechanisms of media 140 may be activated and the two or more data processors 130*a* to 130*k* may be slowed down to insure that information may not be lost due to saturation of media 140.

In some embodiments, a 2-level queuing mechanism as previously described may be used between data processors 130*a-k* and media 140 (not shown in FIG. 1), for at least the purpose of connecting the multiplicity of data processors 130*a-k* to media 140. In these embodiments, there may be no need for any additional flow control mechanisms between data processors 130*a-k* and media 140, as said queuing mechanism may support all the flow control that may be needed. In addition, using another queuing mechanism may guarantee not only maximum utilization of the capacity of media 140 but also fair distribution of that capacity between data processors 130*a-k*.

In yet another aspect of the disclosure, at least one of the one or more of data processor(s) 130*a-k* may be configured to enforce maximum information rate on two or more levels, wherein enforcement may be in accordance with information rates either at the input to the at least one of the one or more of data processor(s) 130*a-k* (e.g. at the input to communication system 100) or at the output of the at least one of the one or more of data processor(s) 130*a-k* (e.g. over media 140).

In addition to enforcing maximum information rate on two or more levels, data processor 130 may be configured to process information going through it prior to scheduling it for transmission over media 140. In some embodiments, said processing may occur prior to queuing said information in level 2 queues 202*a-n*. In some embodiments, said processing of information may include using any one or more algorithms that may alter the information rate (for example compression algorithms, encryption algorithms, acceleration algorithms, etc.). Thus, selecting the information rate point of reference for at least the purpose of enforcing a maximum information rate may affect the enforcement results.

In some embodiments, data processor 130 may be configured to select the information rate point of reference to be at its input, e.g. prior to subjecting the information it received to any algorithm which may alter the information rate. In such embodiments, a user (e.g. 150*a*) may receive information at a rate higher than the maximum information rate (e.g. 203*a*) associated with said user only at times when communication system 100 may be under-utilized (e.g. referring to FIG. 2, when condition 250 may be true). In addition, any reduction in the amount of information actually transmitted over media 140 towards said user (e.g. 150*a*), for example due to any one or more compression/decompression or optimization methods that data processor 130 and any reception device at the user end may be configured to use, may not be visible to said user (e.g. 150*a*). Instead, any capacity gained over media 140 (for example, due to using any one or more of said methods) may be used by communication system 100 for at least the purpose of transmitting information destined for other users (e.g. 150*b* to 150*n*) over media 140.

Wherein data processor 130 may be configured to select the information rate point of reference to be at its input, data processor 130 may be also configured to attach to each unit of information (e.g. an information packet) inserted into level 2 queue 202 either an indication of its original size (e.g. prior to applying any information rate altering algorithms) or an information rate change ratio that may reflect the ratio between the current size of the information unit and its original size. Furthermore, data processor 130 may be configured, upon any forwarding of information from level 2 queues 202*a-n* to level 1 queue 204 to determine the amount of information to forward in accordance with said original size indications or information rate change ratios that may be attached to one or more information units that may be forwarded.

In some embodiments, data processor 130 may be configured to select the information rate point of reference to be at its output, e.g. after subjecting the information it received to any algorithm which may alter the information rate. In such embodiments, an MIR value (e.g. 203*a*) associated with a user (e.g. 150*a*) may define a maximum information rate for said user over media 140. Thus, by using any one or more compression/decompression or optimization methods at data processor 130 and at any reception device at the user end, said user (e.g. 150*a*) may receive information at a rate higher than the maximum information rate (e.g. 203*a*) associated with said user not only at times when communication system 100 may be under-utilized but also at other times. Any reduction in the amount of information actually transmitted over media 140 towards said user (e.g. 150*a*), for example due to employing said methods, may be visible to said user and may be used by said user for receiving more information.

Wherein data processor 130 may be configured to select the information rate point of reference to be at its output, data processor 130 may be configured to enforce maximum information rate on two or more levels in accordance with the methods already described above.

In additional aspect of the disclosure, one or more of data processor(s) 130*a-k* may be configured to estimate a load over media 140.

Data processor 130 may be configured to enforce maximum information rate on two or more levels as previously described, for example using queuing mechanism 200 and an algorithm as shown in flowchart 210 and previously described above. For each spin of the algorithm, data processor 130 may determine whether information may be forwarded from level 2 queues 202*a-n* to level 1 queue 204 in this spin. Upon determining that information may be forwarded from level 2 queues 202*a-n* to level 1 queue 204 in this spin, data processor 130 may be configured to determine the total amount of information (e.g. $Info_T$) forwarded to level 1 queue 204 from all level 2 queues 202a-n in this spin. Data processor 130 may be further configured to then calculate a (current) load on media 140 by dividing said determined total amount of information (e.g. $Info_T$) by the maximum amount of information 205 (e.g. $MIR_T$) that may be forwarded from level 1 queue 204 towards media 140 in a forwarding cycle (spin) (e.g. Load=$Info_T/MIR_T$). It may be noted that upon determining that information may not be forwarded from level 2 queues 202a-n to level 1 queue 204 in this spin, data processor 130 may be configured not to determine said total amount of information (e.g. $Info_T$) and not to calculate a (current) load on media 140 in this spin. Thus, as load may be estimated only in spins in which information may be forwarded from level 2 queues 202a-n to level 1 queue 204 (e.g. in accordance with MIR values associated with the respective users) and while ignoring any limitation of capacity over media 140, the estimated load may reflect the real load on media 140, e.g. in accordance with the total demand for transmitting information to all users (which may exceed the total capacity available over media 140), rather than in accordance with an actual rate at which information may be transmitted over media 140 (which may be limited to the capacity available over media 140).

In some embodiments, where queuing mechanism 200 may be configured to include more than two enforcement levels, the above described method may be used for estimating load at any of the queuing levels except maybe for the first queuing level (e.g. the level associated with the users). For example, in case of using a queuing mechanism with 3 levels, the above described method may be used for estimation load on the output of the level 1 queue and on each of the outputs of the level 2 queues.

In some embodiments, media 140 may occasionally experience variances in capacity (for example, a radio link that may occasionally fade). Using a maximum amount of information 205 (e.g. $MIR_T$) value, when the available capacity over media 140 may be different from that which may be assumed for calculating said maximum amount of information 205, may result in inaccurate estimations. In such embodiments, wherein the available capacity over media 140 may be measured or estimated by means external to data processor 130, data processor 130 may be configured to receive periodic and/or occasional estimations of available capacity over media 140, and to update in real-time or substantially in real-time said maximum amount of information 205 (e.g. $MIR_T$) in accordance with said received estimations, for at least the purpose of correctly estimating a load on media 140. In some embodiments, in addition to said updating of maximum amount of information 205 (e.g. $MIR_T$), data processor 130 may be further configured to also update threshold level 207 (Thr) that may be associated with level 1 queue 204, in accordance with said received estimations and/or in accordance with updated maximum amount of information 205, for example as previously described.

In some embodiments, once a load on media 140 may be estimated, data processor 130 may be configured to use said load estimation for at least the purpose of adjusting maximum information rate settings (e.g. 203) within said maximum information rate enforcement mechanism.

In some embodiments, a satellite communication system may comprise a central station (e.g. a hub) that may include one or more processors (that may correspond to data processors 130a-k) and a plurality of terminals (that may correspond to users 150a-n). Said satellite communication system may be configured to use a limited capacity satellite link (that may correspond to media 140) for transmitting information received at the central station from one or more information sources (110) to said plurality of terminals. Furthermore, said satellite communication system may be configured to use one or more of the methods previously described.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving information to be transmitted to a plurality of destinations over a capacity limited media;
   queuing the received information in a plurality of higher level queues corresponding to the plurality of destinations, respectively, wherein each of the higher level queues is associated with a maximum information rate value of the corresponding destination;
   forwarding information from each of the higher level queues to a corresponding lower level queue in accordance with the maximum information rate value associated with the corresponding higher level queue; and
   forwarding information from a first level queue towards the capacity limited media in accordance with a maximum information rate value associated with the first level queue;
   wherein both the forwarding information from each of the higher level queues to the corresponding lower level queue and the forwarding information from the first level queue towards the capacity limited media are performed in periodic spins, and
   wherein, in each of the periodic spins, there are zero or more cycles of the forwarding information from each of the higher level queues to the corresponding lower level queue and one cycle of the forwarding information from the first level queue towards the capacity limited media.

2. The method of claim 1, wherein the receiving the information comprises receiving a multiplicity of streams using one or more protocols.

3. The method of claim 1, wherein an amount of information forwarded from each of the higher level queues during any one cycle is less than or equal to an amount based on the maximum information rate value associated with the corresponding higher level queue and an interval between spins.

4. The method of claim 1, wherein the forwarding information from each of the higher level queues to the corresponding lower level queue and the forwarding information from the first level queue towards the capacity limited media further comprises:
determining whether at least one cycle of forwarding information from each of the higher level queues to the corresponding lower level queue can be performed;
performing one cycle of forwarding information from each of the higher level queues to the corresponding lower level queue if at least one cycle can be performed;
determining whether an additional cycle of forwarding information from each of the higher level queues to the corresponding lower level queue can be performed;
performing an additional cycle of forwarding information from each of the higher level queues to the corresponding lower level queue if an additional cycle can be performed;
determining that no cycle or no additional cycle of forwarding information from each of the higher level queues to the corresponding lower level queue can be performed; and
performing one cycle of forwarding information from the first level queue towards the capacity limited media.

5. The method of claim 1, further comprising forwarding information from each of the higher level queues to the corresponding lower level queue in accordance with a committed information rate value associated with the corresponding higher level queue.

6. The method of claim 1, wherein the forwarding information from each of the higher level queues to a corresponding lower level queue comprises forwarding information from each of the higher level queues to the first level queue.

7. The method of claim 1,
wherein the forwarding information from each of the higher level queues to a corresponding lower level queue comprises forwarding information from each of the higher level queues to a plurality of lower level queues, and
wherein the method further comprises forwarding information from each of the lower level queues to the first level queue.

8. A method comprising:
receiving first information to be transmitted, over a capacity limited media, to a first destination, and second information to be transmitted, over the capacity limited media, to a second destination;
queuing, based on the first destination and the second destination, the first information in a first higher level queue and the second information in a second higher level queue, wherein the first higher level queue is associated with a first maximum information rate value of the first destination, and wherein the second higher level queue is associated with a second maximum information rate value of the second destination;
forwarding the first information from the first higher level queue to a first lower level queue in accordance with the first maximum information rate value and the second information from the second higher level queue to a second lower level queue in accordance with the second maximum information rate value; and
forwarding the first information and the second information from a first level queue towards the capacity limited media in accordance with a third maximum information rate value associated with the first level queue;
wherein both the forwarding the first information from the first higher level queue to the first lower level queue and the forwarding the first information from the first level queue towards the capacity limited media are performed in periodic spins, and
wherein, in each of the periodic spins, there are zero or more cycles of forwarding a portion of the first information from the first higher level queue to the first lower level queue and one cycle of forwarding a portion of the first information from the first level queue towards the capacity limited media.

9. The method of claim 8, further comprising:
optimizing the first information using an algorithm,
wherein the first maximum information rate value corresponds to an information rate of the first information prior to the optimizing the first information.

10. The method of claim 8, further comprising:
optimizing the first information using an algorithm,
wherein the first maximum information rate value corresponds to an information rate of the first information after the optimizing the first information.

11. A communication system comprising one or more data processors coupled to a limited capacity media, each data processor configured to:
receive information destined to a plurality of destinations;
queue the received information in a plurality of higher level queues corresponding to the plurality of destinations, respectively, wherein each of the higher level queues is associated with a maximum information rate value of the corresponding destination;
forward information from each of the higher level queues to a corresponding lower level queue in accordance with the maximum information rate value associated with the corresponding higher level queue; and
forward information from a first level queue towards the limited capacity media in accordance with a maximum information rate value associated with the first level queue;
wherein each data processor is further configured to perform the forwarding information from each of the higher level queues to the corresponding lower level queue and the forwarding information from the first level queue towards the limited capacity media in periodic spins, and
wherein, in one of the periodic spins, there are zero or more cycles of the forwarding information from the higher level queues to the corresponding lower level queue and one cycle of the forwarding information from the first level queue towards the limited capacity media.

12. The communication system of claim 11, wherein each data processor is further configured to receive the information as a multiplicity of streams using one or more protocols.

13. The communication system of claim 11, wherein each data processor is further configured to forward information from each of the higher level queues to the corresponding lower level queue in accordance with a committed information rate value associated with the corresponding higher level queue.

14. The communication system of claim 11, wherein at least one of the data processors is configured to optimize the received information using one or more algorithms prior to queuing the received information in the plurality of higher level queues, wherein any one or more of the algorithms alters an information rate of the received information.

15. The communication system of claim 11, wherein the maximum information rate value associated with one of the higher level queues corresponds either to an information rate of the received information prior to optimizing the received information or to an information rate of the received information after optimizing the received information.

16. The communication system of claim 11, comprising two or more data processors coupled to the limited capacity media, wherein the system is further configured to:
 associate the first level queue of each data processor with a maximum information rate corresponding to a full capacity of the limited capacity media; and
 use a flow control mechanism between each of the two or more data processors and the limited capacity media.

17. The communication system of claim 11, wherein at least one of the one or more data processors is further configured to estimate a load over the limited capacity media by:
 determining a maximum amount of information that can be forwarded from the first level queue towards the limited capacity media in a single spin;
 determining, for a first spin, a total amount of information forwarded to the first level queue in the first spin;
 determining that the total amount of information forwarded to the first level queue in the first spin is greater than zero; and
 dividing the total amount of information forwarded to the first level queue in the first spin by said maximum amount of information that can be forwarded from the first level queue towards the limited capacity media in a single spin.

18. The communication system of claim 17, wherein the limited capacity media experiences a variance in capacity and wherein the system is configured to:
 measure or estimate available capacity of the limited capacity media by means external to the at least one data processor;
 receive, at the at least one data processor, the available capacity of the limited capacity media; and
 update, in real-time or substantially in real-time, the maximum amount of information that can be forwarded from the first level queue towards the limited capacity media in a single spin.

19. The communication system of claim 11, further comprising:
 a central station; and
 a plurality of terminals,
 wherein the central station comprises at least the one or more data processors; and
 wherein the limited capacity media is a satellite link used for transmitting information from the central station to the plurality of terminals.

* * * * *